United States Patent Office 3,329,721
Patented July 4, 1967

3,329,721
SYNTHESIS OF HYDROXYDIFLUOROAMINO ALKANES
Francisco Q. Roberto, Lancaster, Calif., assignor to the United States of America as represented by the Secretary of the Air Force
No Drawing. Filed Feb. 17, 1964, Ser. No. 345,535
6 Claims. (Cl. 260—584)

The invention that is described herein may be manufactured and used by or for the United States Government for governmental purposes without the payment to me of any royalty thereon.

This invention concerns the new and useful chemical synthesis of hydroxydifluoroamino alkanes from tetrafluorohydrazine and acetone, using iodine as catalyst.

Difluoroamine $HNF_2$ has been used previously in an approach to the production of some members of the general class of compounds that is here of interest.

The object of the present invention is the use of tetrafluorohydrazine, $N_2F_4$, as a difluoroaminating agent with an appropriate catalyst, such as iodine, or is the synthesis of hydroxydifluoroamino alkanes from $N_2F_4$ and acetone or 2-propane, using iodine as catalyst. Iodoform may also be used as catalyst.

A ninety milliliter high-pressure glass reactor provided with a magnetic stirrer is charged with one gram of iodine, and fifty milliliters of acetone, $CH_3COCH_3$. Tetrafluorohydrazine, $N_2F_4$, is admitted from a seventy-five milliliter stainless steel cylinder into the high-pressure glass reactor at 250 p.s.i. The reactor is heated to 60° C. and is maintained at this temperature for six hours. At the end of this reaction period the reactor is cooled and then is vented.

The solution within the reactor is distilled at atmospheric pressure and the fraction that distills over, with the solution maintained within the range of 60° C. to 70° C., is collected. The distillate is identified as a first product of 2-hydroxy-2-difluoroamino propane of the composition:

$$CH_3—(NF_2)C(OH)—CH_3$$

The reactants so combined in stoichiometric proportions open up the double bond between the oxygen and the middle carbon of the acetone to produce the propane product, or in adding the —OHCNF₂— group in an adjacent position to produce the corresponding butane product.

The ketones have the ending -one. Diketones, triketones, etc., are designated by the suffixes -dione, -trione, etc. Acetone or 2-propane has the structure $CH_3COCH_3$ and 2,3-butanedione has the structure $CH_3COCOCH_3$.

Equations that indicate the reactions that are involved are:

(1)
$$CH_3COCH_3 + I_2 + N_2F_4 \xrightarrow[\text{Temperature}]{\text{Pressure}} CH_3ICOCH_3 + HI$$

(2)
$$2HI + N_2F_4 \xrightarrow[\text{Temperature}]{\text{Pressure}} 2HNF_2 + I_2$$

(3)
$$CH_3COCH_3 + HNF_2 \xrightarrow[\text{Temperature}]{\text{Pressure}} CH_3(NF_2)C(OH)CH_3 \text{ or}$$

(3′)
$$CH_3COCH_3 + I_2 + N_2F_4 \xrightarrow[\text{Temperature}]{\text{Pressure}} CH_3(NF_2)C(OH)CH_3$$

(4)
$$CH_3COCOCH_3 + I_2 + N_2F_4 \xrightarrow[\text{Temperature}]{\text{Pressure}} CH_3(NF_2)C(OH)NF_2C(OH)CH_3$$

or a second product identified by the name of 2,3-dihydroxy-2,3-bis(difluoroamino) butane.

It is to be understood that the examples cited herein are illustrative successful embodiments of the present invention and that the process is applicable to corresponding homologues, diketones, triketones, etc., and modifications with corresponding adjustments in temperatures, pressures and reaction time periods without departing from the spirit and the scope of the present invention.

I claim:
1. The process of making as product a hydroxydifluoroamino alkane by combining within a high-pressure reactor reacting quantities of iodine, acetone and tetrafluorohydrazine, increasing the temperature and the pressure to reaction maintaining values, and continuing the reaction temperature and pressure to the reaction completion, and recovering the hydroxydifluoroamino alkane as the reaction product.

2. The process of making as product a hydroxydifluoroamino alkane by charging a high-pressure reactor with stoichiometric quantities of iodoform, acetone, and tetrafluorohydrazine, heating the charge to its reactive temperature and maintaining this reactive pressure to the completion of its reaction, and recovering the hydroxydifluoroamino alkane as the reaction product.

3. The process of making as product hydroxydifluoroamino propane by charging a pressure reactor with one gram of iodine and fifty milliliters of acetone, injecting into the reactor at the pressure of 250 p.s.i. tetrafluorohydrazine, maintaining the pressurized reactor at the temperature of 60° C. for six hours, distilling the contents of the reactor at between about 60° C. to 70° C. to obtain the distillate and recovering as product the hydroxydifluoroamino propane so made.

4. The process of making the end product 2,3-dihydroxy-2,3-bis(difluoroamino) butane by charging a high-pressure reactor with iodine and 2,3-butanedione in reacting quantities, admitting into the reactor at 250 p.s.i. tetrafluorohydrazine, heating the reactor to 60° C. maintaining the reactor at 60° C. and 250 p.s.i. for 6 hours, distilling the reaction product at atmospheric pressure and within the fraction temperature range of about 60° C. to 70° C., collecting the distillate, and recovering the 2,3-dihydroxy-2,3-bis(difluoroamino) butane so produced as end product.

5. The process indicated by the equations $$CH_3COCH_3 + I_2 + N_2F_4 \xrightarrow[\text{Temperature}]{\text{Pressure}} CH_3ICOCH_3 + HI$$

$$2HI + N_2F_4 \xrightarrow[\text{Temperature}]{\text{Pressure}} 2HNF_2 + I_2 \text{ and}$$

$$CH_3COCH_3 + HNF_2 \xrightarrow[\text{Temperature}]{\text{Pressure}} CH_3(NF_2)C(OH)CH_3$$

wherein the reaction pressure is about 250 pounds per square inch, the reaction temperature is about 60° C., and the reaction time is about 6 hours, and recovering as product the $CH_3(NF_2)C(OH)CH_3$ so produced.

6. The process indicated by the equations

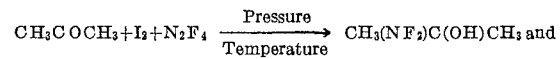

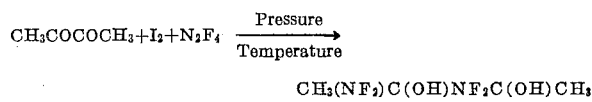

wherein the reaction pressure is about 250 pounds per square inch, the reaction temperature is about 60° C., and the reaction time is about 6 hours, and recovering as product the $CH_3(NF_2)C(OH)NF_2C(OH)CH_3$ so produced.

No references cited.

CHARLES B. PARKER, *Primary Examiner.*

CARL D. QUARFORTH, REUBEN EPSTEIN,
*Examiners.*

L. A. SEBASTIAN, R. RAYMOND,
*Assistant Examiners.*